United States Patent
Herington

(10) Patent No.: US 8,255,917 B2
(45) Date of Patent: Aug. 28, 2012

(54) AUTO-CONFIGURING WORKLOAD MANAGEMENT SYSTEM

(75) Inventor: Daniel Edward Herington, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 899 days.

(21) Appl. No.: 12/238,074

(22) Filed: Sep. 25, 2008

(65) Prior Publication Data

US 2009/0265712 A1 Oct. 22, 2009

Related U.S. Application Data

(60) Provisional application No. 61/046,532, filed on Apr. 21, 2008.

(51) Int. Cl.
*G06F 9/50* (2006.01)
(52) U.S. Cl. .......................................... 718/104
(58) Field of Classification Search ................... None
See application file for complete search history.

(56) References Cited

U.S. PATENT DOCUMENTS

| | | | |
|---|---|---|---|
| 6,725,317 B1* | 4/2004 | Bouchier et al. ............... 710/312 |
| 7,669,029 B1* | 2/2010 | Mishra et al. .................. 711/170 |
| 2002/0171678 A1* | 11/2002 | Bandhole et al. ............. 345/744 |
| 2003/0037092 A1* | 2/2003 | McCarthy et al. ............. 709/104 |
| 2005/0102387 A1* | 5/2005 | Herington ..................... 709/223 |
| 2005/0149940 A1* | 7/2005 | Calinescu et al. ............. 718/104 |
| 2007/0250837 A1* | 10/2007 | Herington et al. ............ 718/105 |
| 2009/0100435 A1* | 4/2009 | Papaefstathiou et al. ..... 718/104 |

* cited by examiner

*Primary Examiner* — Keith Vicary

(57) ABSTRACT

A multi-partition computer system provides a configuration inspector for inspecting partitions to determine their identities and configuration information. The system also includes a policy controller for automatically setting workload-management policies at least in part as a function of the configuration information in response to a command. Computer partitions may be inspected to acquire configuration information such as identity and configuration information regarding workload containers contained by each of the partitions. An automatic policy generator may be triggered to generate policies for allocating resources to workloads as a function of the configuration information.

15 Claims, 2 Drawing Sheets

AUTO-CONFIGURING WORKLOAD MANAGEMENT SYSTEM

This application claims the benefit of U.S. Provisional Application 61/046,532, filed Apr. 21, 2008.

BACKGROUND OF THE INVENTION

Workload management schemes dynamically allocate computing resources to computer workloads according to the time-varying needs of the workloads. This results in considerable savings in computer hardware and other resources since it is not necessary to provision each workload for its peak demand. However, a dynamic allocation scheme must be properly configured to achieve optimal results. In general, a workload management scheme must be told how to determine the needs of each workload and what to do when available resources are not adequate to fulfill all the needs for computing resources.

A typical workload management system requires the user to define the set of workloads over which to share resources. In addition, parameter values must be specified for each workload, such as: 1) minimum and maximum entitlements; 2) guaranteed entitlements; 3) priorities; 4) metrics to be used to determine the amount of resource required; 5) ability to consume utility resources; 6) amount of spare capacity "headroom" to reserve; and 7) how fast resources should migrate to or from the workload.

Specifying all the parameters can be daunting to many users, especially those dealing with many workloads. Therefore, software wizards have been provided to guide users step-by-step through the configuration process. In many cases, a wizard allows a user to pick a default value, e.g., all workloads can be given the same priority and weighting. Selecting default values relieves the user of having to make difficult decisions up front, while allowing the user to refine the configuration later as the need becomes apparent.

While defaults are provided for some parameters, it can be difficult to provide useful defaults for certain other parameters. For example, a user typically must specify the workloads or containers that are to share resources, i.e., form a shared resource domain. Also, users are expected to specify minimum, owned, and maximum resource levels for each workload. Resources "owned" by a workload are allocated to it (if available) unless that workload relinquishes them temporarily because it does not need them. Thus, even with the help of a wizard, there are some difficult decisions that must be made by a user before a shared resource domain is set up and the promises of workload management can be fulfilled.

Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

The present invention provides for inspecting a computer system to gather information to be used to provide system-dependent default values for workload-management parameters. These values are "system-dependent" in that they take the system configuration into account. They differ from system-independent defaults, for which useful values can be selected without knowing system specifics.

Figure 1:
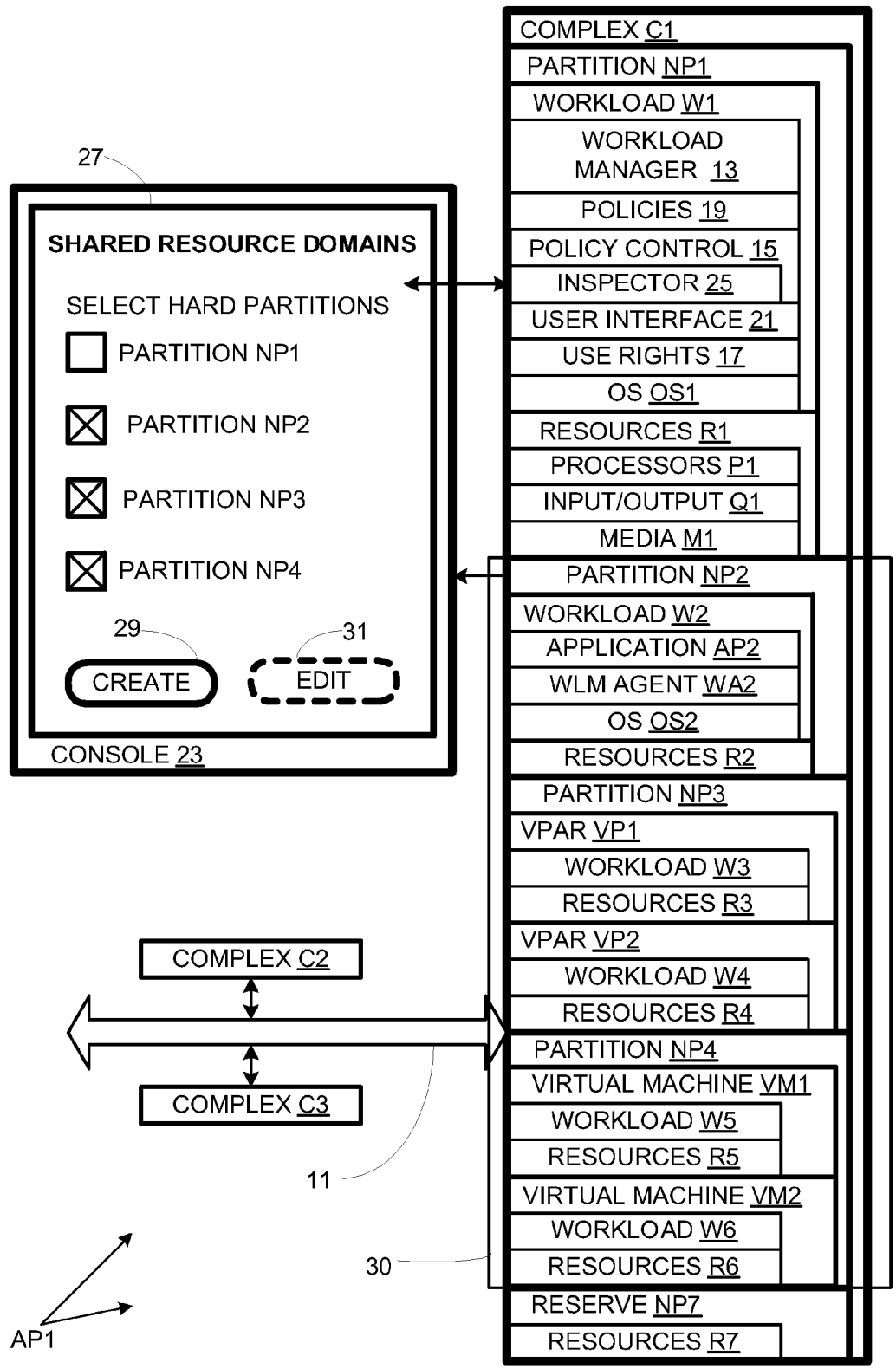
FIG. 1 is a schematic diagram of a computer system in accordance with an embodiment of the invention.

As shown in FIG. 1, a computer system API includes complexes C1, C2, and C3 connected by network 11. In the illustrated embodiment, hardware computer resources can be shared freely among partitions of a complex, but not between complexes. Complex C1 is divided into four hard partitions NP1-NP4 and reserve hardware NP7. Hardware partitions NP1-NP4 are workload containers in that that each can and do contain workloads. Hardware partitions NP1 and NP2 each contain a respective workload W1 and W2. Hardware partition NP3 contains sub-containers in the form of virtual partitions VP1 and VP2 that contain respective workloads W3 and W4. Hardware partition NP4 contains sub-containers in the form of virtual machines VM1 and VM2 that contain respective workloads W5 and W6.

Each workload includes an instance of an operating system. For example, workload W1 includes operating system OS1, whereas workload W2 includes operating system OS2. The operating systems may be instances of the same operating system or different operating systems. Each workload typically includes one or more application programs that define the mission for the workload: Workload W1 includes a workload manager application 13, a policy control application (policy controller) 15, and a use-rights manager 17; workload W2 includes application AP2. In addition, each workload includes a workload management agent, e.g., workload W2 includes workload management agent WA2, that coordinates with workload manager 13 in the dynamic allocation of resources to workloads. In addition to executable programs, each workload can include data, e.g., policies 19 of workload W1 are configuration data used by workload manager 13. Generally, the invention provides for both distributed and centralized workload management schemes.

Each workload requires computing resources, e.g., resources R1-R6. These resources include hardware resources, such as processors P1, input/output devices Q1, and a computer product in the form of media M1 (including memory and disk storage). In addition, the computing resources can include software, e.g., some utility programs such as health-monitors for a partition or an application. Furthermore, computing resources can include use rights, including those tracked by user rights manager 17.

These resources R1-R6 can be dynamically reallocated among the workloads based on need. For example, if the processor utilization for workload W2 exceeds some specified threshold, say 75%, additional processors can be transferred to workload W2 if the processors are "available" and if workload W2 has or can acquire the licensing rights for those processors. Thus, the specific resources that are included in resources R1-R6 respectively can change each allocation period. Reserve NP7 contains resources R7, which are not available to any workload while in reserve, but which can be made available through the acquisition of additional use rights.

Workload manager 13 coordinates with its agents, e.g., agent WA2, to dynamically allocate resources R1-R7 to workloads W1-W6 according to management policies 19. Use rights module 17 is used to track use rights to ensure the latter are complied with; in addition, use rights manager 17 provides for acquiring additional use rights through transfer or purchase. Policy controller 15 is used for setting and editing management policies 19. User interface 21 provides for user interaction via a console 23, e.g., with policy controller 15 for editing policies 19.

Policies 19 specify parameter values to guide workload manager 13. Policies 19 specify which workloads constitute a shared resource domain (so that they share resources) and how the resources are to be shared. In addition, the policies can specify an allocation period (e.g., 1 minute) and how fast resources should migrate to or from a workload. Workload manager 13 monitors resource utilization and uses the data gathered to project, for each workload, its needs for resources in the next allocation period as a function of a metric specified by policies 19.

For each resource type, e.g., processors, workload manager 13 plans an allocation of resources serially, with each unit being assigned to the workload with the greatest unsatisfied need. Each time a resource unit is assigned to a workload, the unsatisfied portion of its need is reduced, so the next unit may or may not go to another workload. The order in which resources are allocated depends on policies that set priorities and weightings. However, the individual decisions are constrained by minimum, maximum, and owned values specified in the policies as follows.

1) No workload is assigned more than its minimum until the minima for all workloads have been satisfied.

2) No workload is assigned more that the needed portion of its owned amount until all workloads have been assigned the needed portions of their owned amounts.

3) No workload is assigned more than the amount it needs until the needs of all workloads have been satisfied.

4) No workload that needs more than it owns can be assigned more resources than it needs until the owned amounts for all workloads have been satisfied.

5) No workload is assigned more than its maximum amount for a Resource type.

From the foregoing, it can be seen that the minimum, maximum, and owned levels have a major impact on resource allocations. This is one reason it can be difficult to set system-independent default values for them. On the other hand, it is also a reason that a user might feel challenged to set them.

Policy controller 15 includes an inspector 25 for examining the configuration of computer system AP1. In other embodiments, the inspector function can be provided by a separate program or be integrated with a different program such as the workload manager. Inspector 25 inspects computer system AP1 to determine its configuration in general and its containment structure in particular. For example, inspector 25 can identify complexes C1, C2, and C3 and their hard partitions, virtual partitions, and virtual machines. When containers are established, certain parameters must be set, although some may be modified later. For example, the (positive integer) number of cells (units of computer resources) in a hard partition, the (integer) number of processors assigned to a virtual partition, and the (fractional or mixed) number of processors assigned to a virtual machine are determined. Inspector 25 gathers all this information regarding the container structure for use by policy controller 15.

As shown in FIG. 1, workload W2 is in hard partition NP2. Each partition NP1-NP4 is constituted by a positive integer number of cells, each with two processors. At least one cell is required for partition NP2 to exist; one core per cell can be set as a minimum for workload W2. The number of cells in partition NP2 can be determined and the number of processors is twice that. The total number of processors in partition NP2 can be the maximum for workload W2. The owned amount can be set 1) to the minimum, 2) to an average of the minimum and maximum, or 3) equal to the number of permanent rights held in the resource under consideration.

Workload W3 is contained in a virtual partition VP1. The virtual partition technology employed in complex C1 requires at least one processor per virtual partition. Therefore, workload W3 can be assigned a minimum of one processor. A maximum number of processors is defined in the configuration for each virtual partition. The maximum for virtual partition VP1 can be used as the maximum for workload W3. Once again, the minimum or average of minimum and maximum or the amount of permanent rights held can be selected as the system-dependent default owned amount for workload W3. The minimum, maximum, and owned amounts for workload W4 can be set similarly.

Workload W5 is contained in a virtual machine VM1. Virtual machines can use fractional processor amounts with no hard minimum. However, some minimum, e.g., 5% of a core, is required for the operating system to run, so that minimum can be used for a virtual machine. The maximum number of processor cores that can be assigned to virtual machine VM1 is the maximum number of cores that can be assigned to partition NP4 less the 5% of a core required for virtual machine VM2. The owned amount can be set equal to: the 1) minimum, 2) an average of the minimum and maximum, or 3) the amount of rights held by the underlying physical server or partition distributed in proportion to the minima for each virtual machine. The parameters for workload W6 can be set similarly.

Inspector 25 can determine from the configuration data what workloads can form a shared resource domain for resource sharing. For example, all workloads run on the same complex can share resources. Therefore, by default, policy controller 15 can treat each complex as defining a shared resource domain. Another option is to allow a user to select a workload and let policy controller 15 determine which other workloads can be in a shared resource domain with it. That shared resource domain then can be automatically configured by policy controller 15.

For example, a user can right click on a graphic representation of workload W2 and select "create shared resource domain" from a drop-down menu. User interface 21 then presents the dialog box 27 shown in FIG. 1. Partitions NP2-NP4 are checked by default, while workload management partition NP1 is left unchecked. Clicking CREATE button 29 causes inspector 25 to inspect the configuration of system AP1. Inspector 25 determines that workload W2 is run in partition NP2 on complex C1, which also runs virtual partitions VP1 and VP2 and virtual machines VM1 and VM2. Therefore, the associated workloads W2-W6 can define a shared resource domain 30.

The minimum, maximum, and owned values for each workload can be set as described above. In the same process, policy controller 15 can set system-independent defaults such as convergence rate (e.g., 100%), reallocation interval (e.g., 5 seconds), priorities (equal priorities), weights (e.g., all equal to 1), target utilization (e.g., 75%). In some cases a more optimal result can be achieved using system-dependent defaults for these parameters as well. When finished, policy controller 15 can offer the option to tweak or "finish". Workload manager 13 can now do its job without requiring difficult decisions to be made by the user, and system AP1 can take advantage of dynamic workload management without waiting for a user to decide on parameter values. In any event, if the operation of complex C1 is not satisfactory, the user can call up the view on console 27, and click EDIT button 31 to override any system-dependent or system-independent default values automatically set by policy controller 15.

The present invention addresses workloads that contain an operating system, as opposed to workloads that manage processes of an operating system. An "operating system" (OS) is the software that manages the sharing of the resources of a computer and provides programmers with an interface used to access those resources. Examples include HP-UX and other forms of Linux and Unix, and Windows. An operating system processes system data and user input, and responds by allocating and managing tasks and internal system resources as a service to users and programs of the system. At the foundation of all system software, an operating system performs basic tasks such as controlling and allocating memory, prioritizing system requests, controlling input and output devices, facilitating computer networking, and managing files. Most operating systems come with an application that provides an interface for managing the operating system. The operating system forms a platform for other software.

Figure 2:
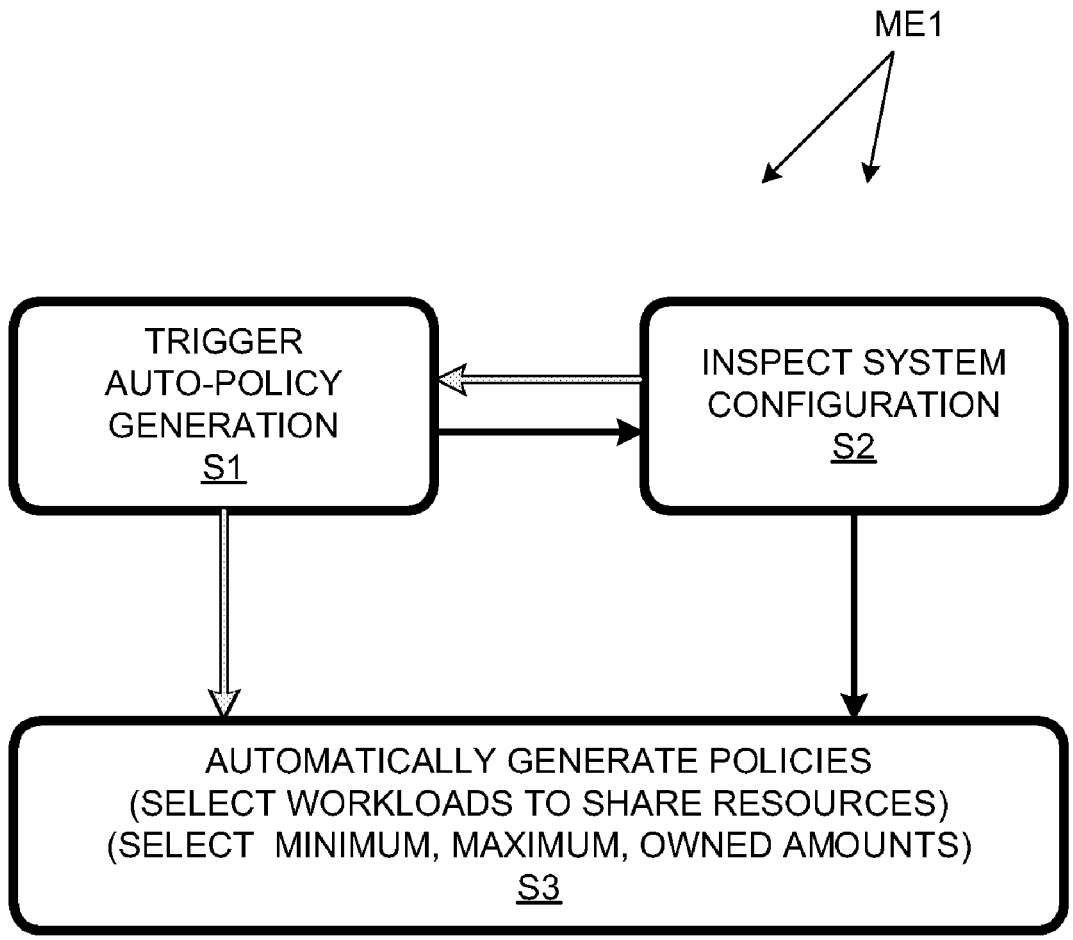
FIG. 2 is a flow chart of a method in accordance with an embodiment of the invention.

A method ME1 in accordance with an embodiment of the invention is represented in the flow chart of FIG. 2. At method segment S1, a user triggers a process of generating workload management policies; for example, pushing CREATE button 29. At method segment S2, the configuration of the computer system is inspected; for example, the configuration of computer system AP1 is checked as to the number and configuration of partitions. At method segment S3, the policies are set in part as a function of the data gathered by inspecting the computer system.

The invention provides for a pair of variants of method ME1. In the first variant, the inspection of the system is triggered in response to the user's activation. In the second variant, the inspection is done ahead of time (or periodically), so that when the user triggers policy generation, the necessary system information is already on hand. These and other variations upon and modifications to the illustrated embodiments are provided for by the present invention, the scope of which is defined by the following claims.

What is claimed is:

1. A multi-partition computer system comprising:
    plural hard partitions;
    computing resources;
    plural workloads configured to run in said partitions using said computing resources, each of said workloads including an operating system;
    a workload manager for dynamically assigning said resources to said workloads according to workload-management policies;
    a configuration inspector for inspecting said partitions to acquire configuration information regarding workload containers contained by each of said partitions; and
    a policy controller for automatically setting said policies at least in part as a function of said configuration information in response to a command.

2. A system as recited in claim 1 wherein at least one of said partitions contains a virtual partition or a virtual machine.

3. A system as recited in claim 1 wherein said system provides a user interface that provides a button that, when activated, causes said policy controller to set said policies automatically.

4. A system as recited in claim 1 wherein said workload manager dynamically assigns computing resources including processors and licensing rights for those processors.

5. A system as recited in claim 1 wherein said policy controller sets minimum, maximum, and owned resource levels automatically for each of said partitions and containers at least in part as a function of said configuration information.

6. A method comprising:
    inspecting computer partitions to acquire configuration information regarding workload containers contained by each of said partitions;
    triggering an automatic policy generator to generate policies for allocating resources to workloads; and
    generating said policies for allocating resources to workloads as a function of said configuration information.

7. A method as recited in claim 6 wherein said inspecting is performed in response to said triggering.

8. A method as recited in claim 7 wherein said inspecting is performed prior to said triggering.

9. A method as recited in claim 8 wherein at least one of said workloads is contained by a virtual partition or a virtual machine.

10. A method as recited in claim 9 wherein said policies specify parameters including, but not limited to, minimum, maximum, and owned levels of resources to be considered when allocating said resources to said workloads.

11. A computer product comprising non-transitory computer-readable media encoded with a program of computer-executable instructions, said program including:
    an inspector for inspecting computer partitions to acquire configuration information regarding workload containers contained by each of said partitions; and
    a policy controller for generating policies for allocating resources to workloads as a function of said configuration information, said policy controller having an associated user interface providing a trigger that when activated by a user causes said policy controller to generate said policies automatically.

12. A computer product as recited in claim 11 wherein said inspector performs said inspecting in response to activation of said trigger.

13. A computer product as recited in claim 11 wherein said inspector determines for each of said partitions whether the partition contains virtual partitions, virtual machines, or neither.

14. A computer product as recited in claim 11 wherein said policy controller generates policies specifying parameters including, but not limited to, minimum, maximum, and owned levels of resources to be considered when allocating said resources to said workloads.

15. A computer product as recited in claim 11 wherein said resources include hardware resources and rights to use said hardware resources.

* * * * *